United States Patent [19]
Huebner et al.

[11] Patent Number: 5,907,977
[45] Date of Patent: Jun. 1, 1999

[54] PARKING BRAKE OPERATING SYSTEM HAVING A TAKE-UP REEL LOCKOUT AND RELEASE MECHANISM, AND METHOD OF ASSEMBLING SAME

[75] Inventors: Mark Andrew Huebner, Clinton Township; Thomas Edward Paré, Westland, both of Mich.

[73] Assignee: Dura Automotive Systems, Inc., Rochester Hills, Mich.

[21] Appl. No.: 08/641,236

[22] Filed: Apr. 30, 1996

[51] Int. Cl.[6] ........................................ F16C 1/10
[52] U.S. Cl. ........................ 74/501.5 R; 74/535; 74/536
[58] Field of Search .............................. 74/501.5 R, 512, 74/535, 536; 188/196 F, 198, 199, 200

[56] References Cited

U.S. PATENT DOCUMENTS

| | | | |
|---|---|---|---|
| 4,515,036 | 5/1985 | Dotson | 74/535 |
| 4,841,798 | 6/1989 | Porter et al. | 74/501.5 R |
| 4,850,242 | 7/1989 | Hass et al. | 74/512 |
| 5,001,942 | 3/1991 | Boyer | 74/535 |
| 5,235,867 | 8/1993 | Wortmann | 74/501.5 R |
| 5,309,786 | 5/1994 | Pare et al. | 74/512 |
| 5,533,420 | 7/1996 | Perisho | 74/512 |

*Primary Examiner*—Charles A. Marmor
*Assistant Examiner*—Saúl Rodríguez
*Attorney, Agent, or Firm*—Douglas E. Sittler; Michael K. Boyer

[57] ABSTRACT

A cable tensioning system for removing s lack from a parking brake cable or the like including a parking brake cable operator having an improved resettable lockout arrangement for retaining an adjuster take-up reel in a spring-biased caged condition until the adjuster reel is connected to a first brake cable component. The first brake cable component is in turn connected to a second cable component which is in turn connected to the vehicle wheel parking brakes. The cable tensioning system provides enhanced efficiency during automotive assembly as well as when making repairs.

17 Claims, 2 Drawing Sheets

PARKING BRAKE OPERATING SYSTEM HAVING A TAKE-UP REEL LOCKOUT AND RELEASE MECHANISM, AND METHOD OF ASSEMBLING SAME

BACKGROUND OF THE INVENTION

Systems for automatically removing slack from a parking brake cable by means of a ratchet and pawl mechanism are well known in the patented art. For example, U.S. Pat. No. 5,001,942—Boyer et al and U.S. Pat. No. 5,4676,666—Soucie disclose such mechanisms.

U.S. Pat. No. 5,235,867—Wortmann et al discloses a ratchet and pawl mechanism for automatically removing parking brake cable slack in which the cable take-up reel can be locked into a spring-biased caged condition by various lockout means disclosed therein. Once the parking brake cable is attached to the parking brake control and to the wheel brake assembly, the Wortmann et al lockout devise is released during the first application of the parking brake control by movement of the operating lever from its parking brake released position toward its parking brake applied position. It is necessary in this disclosure to wind the cable take-up reel against the force of the adjuster spring in order to set the lockout device in the locking position. Such winding can be difficult, especially after the parking brake control has been installed in the vehicle in which it is to be operated.

Systems for automatically removing slack from a parking brake cable by means of a spring clutch mechanism are also well known in the patented art. For example, U.S. Pat. No. 4,850,242—Hass et al and U.S. Pat. No. 5,309,786—Pare et al disclose such structures.

SUMMARY OF THE INVENTION

In some installations, it is desirable for the cable take-up reel to remain in its spring-biased caged or lockout position despite one or more actuations of the parking brake control toward the parking brake applied position. For example, sometimes it is desirable when assembling the vehicle first to install the parking brake control, then to attach the front parking brake cable (that being the cable leading from the take-up reel, whether or not it actually is toward the front of the vehicle), then to move the parking brake control to the parking brake-applied position, then to install the console over the parking brake control only while that control is in such brake-applied position, then to return the parking brake control to the parking brake-released position, then to connect the rear parking brake cables so that they are operatively attached to the rear wheel parking brake mechanisms as well as to the front parking brake cable, and, only subsequently, to release the lockout mechanism, thus releasing the cable take-up reel from its caged or lockout position and allowing the adjuster spring to move the take-up reel and take up the slack in the cables.

Depending upon the assembly procedures for the vehicle, the parking brake control may have its cable take-up reel held in the lockout position from the time that it is constructed, through various materials handling stages such as shipping and storage, and installation of the parking brake control in the vehicle. In other instances, the cable take-up reel may be rotated until it reaches its desired locking position, and the lockout mechanism actuated, after the parking brake control has already been installed in the vehicle. This is particularly desirable when repairs are being made such as replacement of a component of the parking brake cable subassembly.

Therefore another object of the invention is to provide a system for automatically removing slack from a parking brake system in which the cable take-up reel can be quickly and easily wound against the force of its adjuster spring during the setting or resetting of the lockout mechanism into the locked position or the released position.

Other objects and advantages of the invention will be come apparent from a study of the following specification when viewed in light of the accompanying drawings.

DETAILED DESCRIPTION

Figure 1:
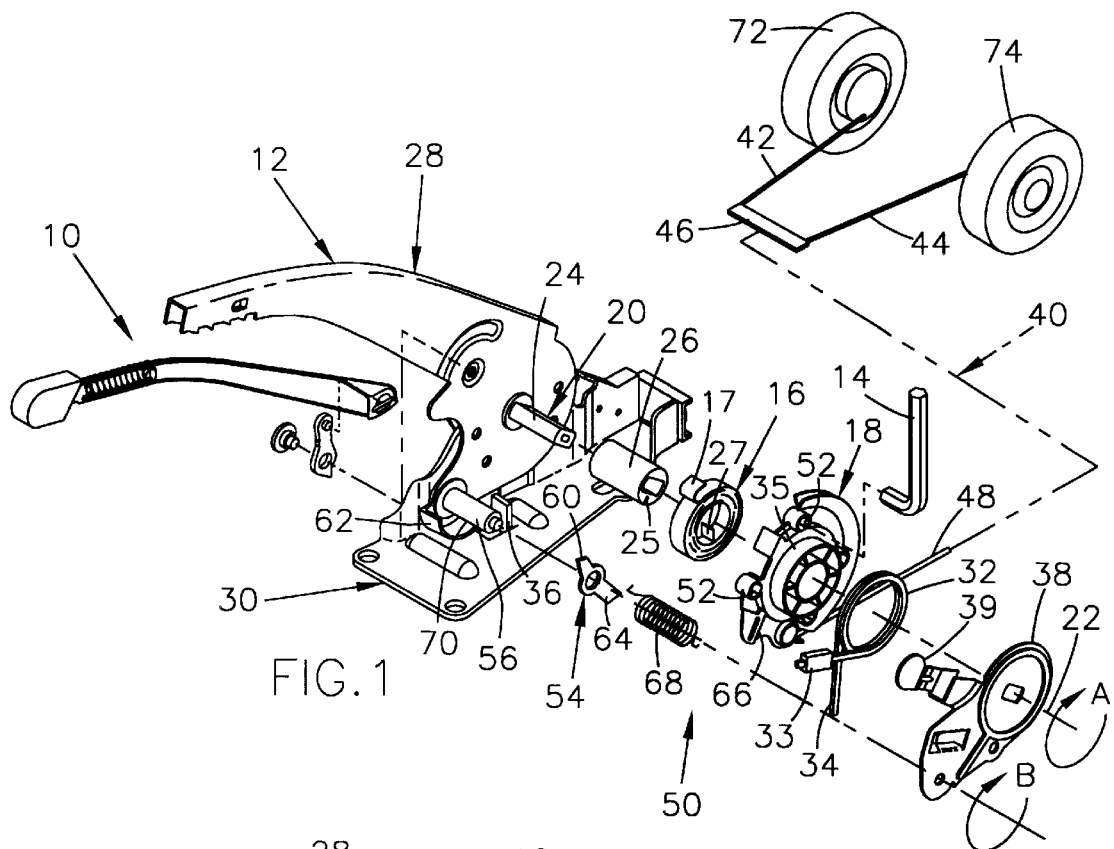
FIG. 1 is an exploded perspective view of an embodiment of the invention with parts shown schematically.
Figure 2:
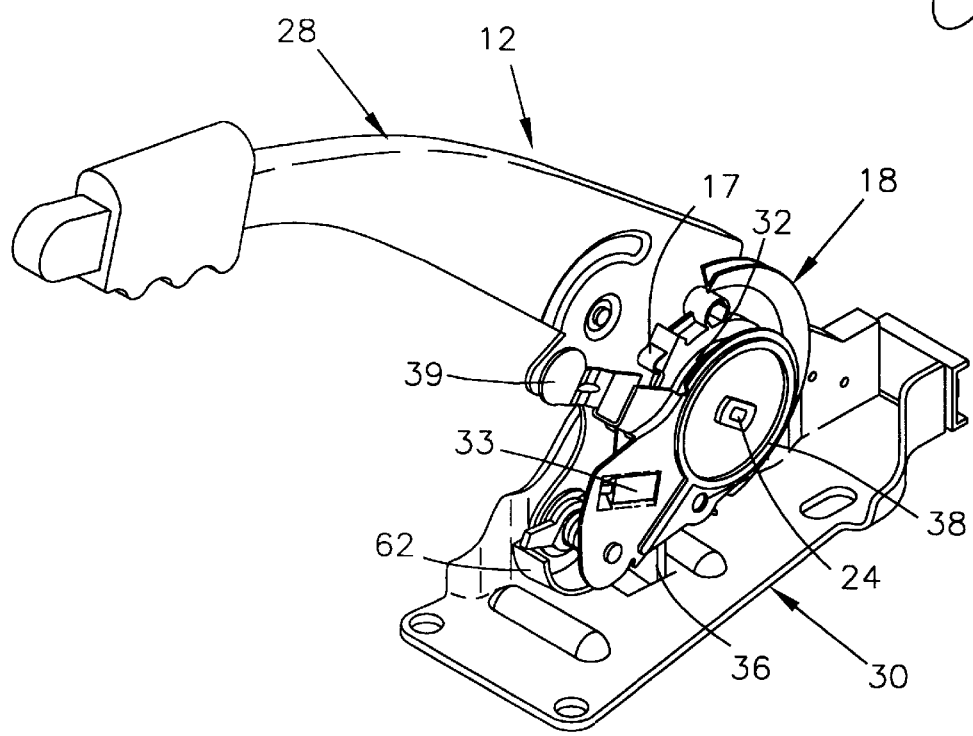
FIG. 2 shows the FIG. 1 embodiment in an assembled condition, and by a dashed line relates it to the embodiment of FIG. 1.
Figure 3:
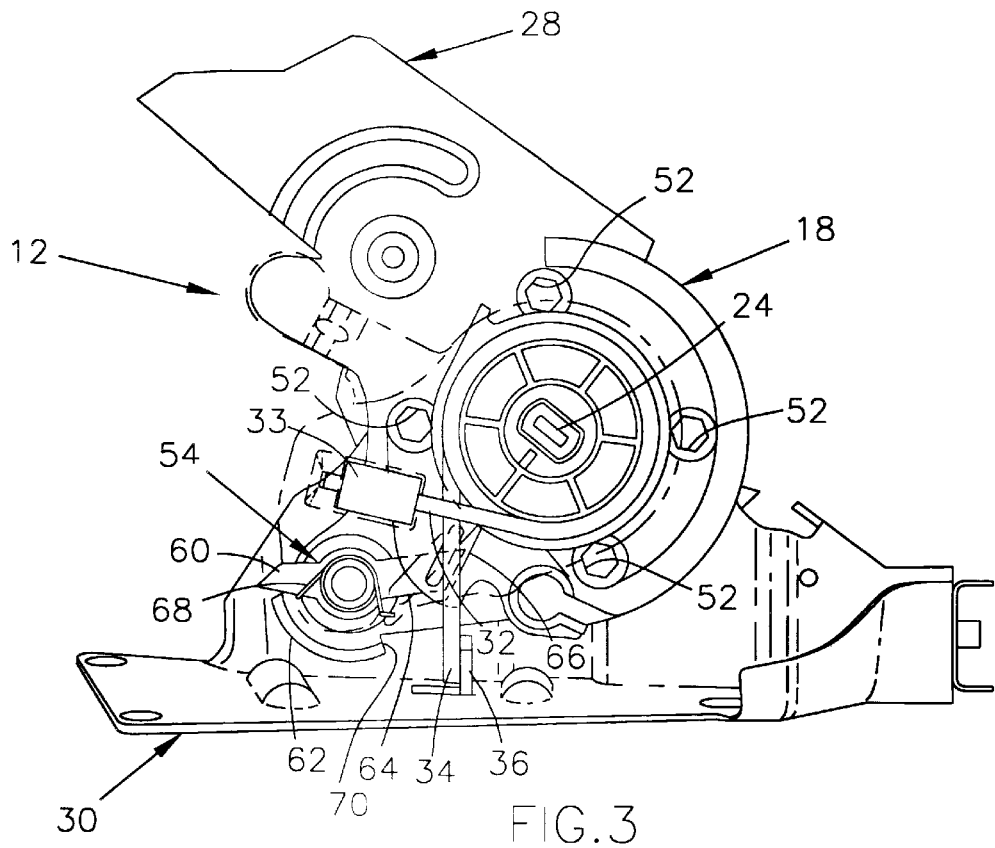
FIG. 3 shows the mechanism of FIG. 1 in an assembled condition with the take-up reel being in a latched or locked position.

FIG. 1 discloses an embodiment of the invention incorporated into a parking brake system 10 operated by a hand operated parking brake control 12 of the type which includes a spring clutch mechanism for automatically removing slack from a parking brake cable. Such a control 12 comprises all of the illustrated components except for the removable lever 14, which may be any of several configurations, and the brake cable subassembly 40 later described. It has been found that a common Allen wrench, as illustrated functions well as the removable lever. At times, as will be further described, it is desirable to have two such Allen wrenches available.

In the parking brake control 12, an adjuster spring 16, which is shown as a coil torsion spring, has one end 17 which engages the cable take-up reel 18 so that reel 18 is biased in a first rotational direction, which is clockwise in FIG. 1 as indicated by Arrow A, on the rivet-pivot support 20 around a first axis 22. The rivet-pivot support 20 is shown as having two components, one of which is the axle-like rivet part 24 and the other of which is the bushing 26 which fits non-rotatively over rivet part 24. Bushing 26 has a slot 25 in which the inner end 27 of spring 16 is received. One end of rivet part 24 is secured, such as by riveting it, to the parking brake operating lever 28 so that arcuate movements of that lever relative to the fixed support bracket 30 are transmitted to the take-up reel 18 when the take-up spring clutch 32, anchored by one end 33 to the cover 38, also grips the reel hub 35.

Figure 4:
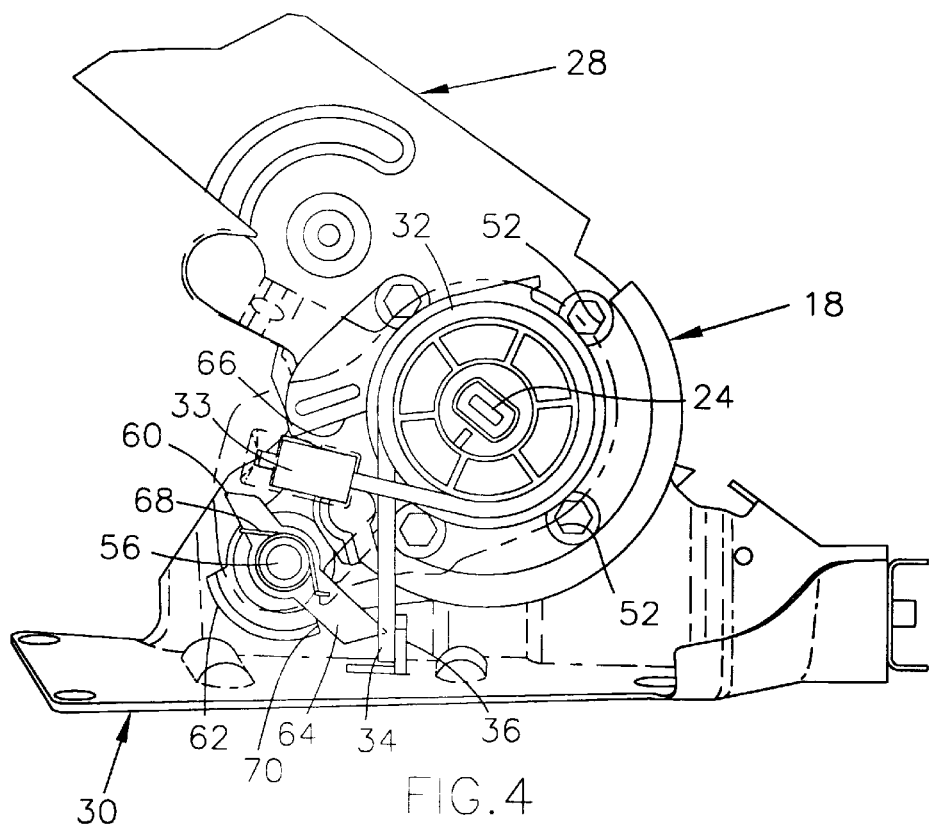
FIG. 4 is similar to FIG. 3, but shows the take-up reel and lockout mechanism in its released position.

The cover 38 is secured to the operating lever 28 by the cover tab 39. When the operating lever 28 is in the brake-released position shown in FIG. 4, the free end 34 of the spring clutch 32 engages a tab 36 formed on mounting bracket 30, maintaining the spring clutch 32 in a clutch-disengaged relation to the hub 35, allowing the take-up reel 18 to be rotated on hub 35 in either a clockwise or a counter-clockwise direction, thus in either the direction of or opposite to the direction of arrow A, by the force of the adjuster spring 16 until the adjuster spring force comes into equilibrium with the force of the parking brake cable subassembly 40 as transmitted through that subassembly's rear cables 42 and 44, its equalizer 46 and its front cable 48 to the take-up reel. Thus slack is removed from the cable components of the parking brake cable subassembly 40, as is known in the art.

When the parking brake operator now pivots the operating lever 28 toward its parking brake-applied position, moving the cover 38 and the anchor end 33 of spring clutch 32 with it, the free end 34 of spring clutch 32 is lifted from tab 36, allowing the spring clutch to grippingly engage the hub 35. When the operating lever 28 is again returned to its brake-released position, the spring clutch free end 34 again engages tab 36 and the spring clutch is disengaged from the hub 35, as set forth above.

In the usual course, the parking brake control 12 is shipped to the vehicle assembly plant without the parking brake cable subassembly 40 being attached. That subassembly is usually shipped separately, at times from a different plant or even a different supplier. The present invention provides an improved lockout mechanism 50 for holding the cable take-up reel 18 at or slightly beyond a predetermined arcuate distance from its brake-released position. This arcuate distance defines the lockout position of the cable take-up reel 18, after the cable take-up reel has been wound in a counter-clockwise direction against the force of the adjuster spring 16, to assist in attachment of the end of the front cable component 48 to the cable take-up reel.

In one embodiment of the present invention, one or more holes 52 are provided in cable take-up reel 18 which mate with an end of removable lever 14. When lever 14 is a typical Allen wrench, with a hexagonal cross-section, holes 52 are likewise hexagonal and of a size to receive an end of the lever 14 in a nice fit. The holes may have other polygonal or non-circular shapes with at least one end of lever or levers 14 having a corresponding mating polygonal or non-circular shape. With the insertion of a removable lever 14 in a hole 52, the operator may apply a force to lever 14 which will arcuately move the cable take-up reel in a counter-clockwise direction to or past the lockout position. If any part of the parking brake control 12 or the bracket 30 interferes with the movement of removable lever 14 before the lockout position of the take-up reel is reached, another similar lever can be inserted into another one of the holes 52, held and the first lever removed from its hole 52. The cable take-up reel 18 can then be rotated further toward its lockout position. When necessary, this process may be repeated as many times as necessary with sufficient such holes 52, appropriately arranged, and with a plurality of such removable levers, until the cable take-up reel 18 has been rotated at least to its lockout position.

With the cable take-up reel 18 rotated to or just past its lockout position, lockout pawl 54 of lockout mechanism 50, which is rotatably mounted on the latch rivet 56 secured to a part of the operating lever 28, then can be rotated in a counter-clockwise direction about the third axis 58 passing axially through latch rivet 56. This counter-clockwise rotation is the opposite rotational direction from the clockwise direction indicated by arrow B of FIG. 1. When so rotated, it moves until the first leg 60 of pawl 54 stops against the first stop 62 provided on operating lever 28. This places the second leg 64 of pawl 54 in position to contact the second stop 66, located on cable take-up reel 18, upon release of the cable take-up reel 18, thus setting lockout pawl 54 in its locking position, despite the countervailing force of the lockout spring 68 tending to rotate the pawl 54 clockwise in the direction of arrow B of FIG. 1.

When the cable take-up reel 18 is rotated again in a counter-clockwise direction through a predetermined arc, that being in the opposite rotational direction from that indicated by arrow A, the lockout pawl second leg 64 is freed from its locking engagement with the take-up reel stop 66, and lockout spring 68 rotates lockout pawl 54 in a clockwise direction, as indicated by arrow B, until its second leg 64 engages and stops against the third stop 70 on operating lever 28. This places the lockout pawl 54 in its released position. In this position, pawl 54 can no longer touch the cable take-up reel 18, and therefore cannot prevent rotation of the reel in the clockwise direction indicated by arrow A. The degree of such counter-clockwise rotation of the take-up reel 18 necessary to so release lockout pawl 54 from its locking position can be determined by relative configuration of the pawl second leg 64 and the second stop 66.

However, cable take-up reel 18 cannot be rotated in a counter-clockwise direction, once the operating lever 28 has been moved from its brake-released position toward its brake-applied position, due to the gripping engagement of the spring clutch 32 with the hub 35. Therefore, once the lockout pawl 54 has been set in its locking position and engaged with the cable take-up reel second stop 66, spring clutch 32 retains the cable take-up reel 18 in its lockout position and prevents release of lockout pawl 54 from its locking position, despite progressively increasing cable force acting on the reel in a counter-clockwise direction upon progress movement of the operating lever toward its parking brake-applied position.

Due to the combined action of the lockout mechanism 50 and the spring clutch 32, the parking brake control 12 can be installed in the vehicle and, whether or not the front parking brake cable 48 is attached to the parking brake control reel 18, the operating lever can be moved from its brake-released position toward its brake-applied position without inadvertent release of the lockout mechanism 50, facilitating installation of other vehicle components, such as the console, over or around the parking brake control 12.

After installation of one or more such other components, the rear parking brake cables 42 and 44 can be easily attached, through the equalizer 46, to the front parking brake cable 48 and the parking brake assemblies 72 and 74 at the vehicle wheels while there is still plenty of slack in the cables 42, 44 and 48. This slack is maintained for this purpose at this time by maintaining the cable take-up reel in its lockout position as above described until this attachment step of assembly of the system is completed.

After installation of the parking brake cables 42, 44 and 48 is completed, the lockout mechanism 50 can be easily released from its locking position by first setting the parking brake control 12, and particularly its operating lever 28, in the brake-released position, in which position the spring clutch 32 is disengaged from the hub 35. After that is done, a tension force is applied to the parking brake cable 48, pulling it and causing the take-up reel to rotate sufficiently in a counter-clockwise direction so as to release the lockout mechanism 50.

The parking brake control disclosed in the above-noted Wortmann et al patent is designed to release the lockout mechanism upon the first application of the operating lever when cable load is built up. In that control, the cable take-up reel, in its initial caged position, is free to rotate in a counter-clockwise direction opposite to the urging of its adjuster spring even after the operating lever is moved toward its brake-applied position. Accordingly, the front parking brake cable of Wortmann is attached to the control and is subject to dragging or catching on other parts of the vehicle while the operating lever or handle is being set in the brake-applied position in preparation for installation of the console, the lockout mechanism can be inadvertently released. Such premature release immediately takes up slack in the front brake cable, causing the later connection of the rear parking brake cables to the parking brake control and the rear wheel parking brakes to be extremely difficult. The invention herein disclosed and claims obviates this problem by assuring that the lockout mechanism is not prematurely released.

For service of the parking brake system, such as replacement of one or more of the parking brake cables or replacement of the parking brake control itself, the front parking brake cable can be severed and later replaced. If the same parking brake control is to be used, its lockout mechanism 50 can be reset to its locking position engaged with cable take-up reel 18, as set forth above using one or more of the removable levers 14. Thereafter, when appropriate, the parking brake control lockout mechanism 50 can be released in the same manner as set forth above.

We claim:

1. A parking brake system comprising a cable tensioning mechanism for removing slack from an installed parking brake cable, said system comprising:
    a mounting bracket;
    an operating lever connected said bracket for pivotal movement about a first axis between brake-released and brake-applied positions, said operating lever having a first stop and a second stop formed thereon in spaced relation about a second axis which is parallel to said first axis;
    a cable take-up reel connected to said bracket for rotation about a third axis, said reel being adapted for connection with one end of said parking brake cable and having a third stop formed thereon positioned in a common plane with said first and second stops;
    an adjuster spring engaging and rotatably biasing said cable take-up reel with a predetermined biasing force in a first rotational direction of said reel about said third axis;
    a lockout mechanism connected to said operating lever for pivotal movement on said lever about said second axis, said lockout mechanism comprising:
        a lockout pawl having a first leg and a second leg located in the common plane with said stops; and
        a lockout spring engaging said pawl and rotatably biasing said pawl in said same first rotational direction about said second axis;
    said lockout pawl being settable in a locking position with said cable take-up reel by rotating said reel in a second rotational direction opposite to said first rotational direction until said third stop is rotated past a predetermined position, then rotating said lockout pawl in said second rotational direction on said second axis until said first leg stops against said first stop, then releasing said cable take-up reel and allowing said cable take-up reel to rotate due to the force of said adjuster spring until said third stop stops against said lockout pawl first leg;
    said lockout pawl being settable in a released position from said locking position by rotating said cable take-up reel in said second rotational direction until said cable is tensioned above a predetermined tension force value relative to the force exerted in opposition thereto by said adjuster spring such that said first stop no longer engages said pawl first leg, whereupon said lockout spring rotates said lockout pawl in said first rotational direction until said first leg stops against said first step, in which position said lockout mechanism completely clears the path of rotation of said cable take-up reel.

2. The parking brake system of claim 1 wherein said second axis is axially aligned with said first axis.

3. The parking brake system of claim 1 further comprising a spring clutch, wherein said cable take-up reel is selectively held against rotation and released by said spring clutch.

4. The parking brake system of claim 1 further comprising at least one removable lever, wherein said cable take-up reel is selectively connected with said at least one removable lever and when so connected may be rotated by movement of said at least one removable lever.

5. The parking brake system of claim 4 wherein said cable take-up reel is so connected with said at least one lever through at least one hole in said cable take-up reel through which an end of said at least one lever fits in mating and driving relation.

6. The parking brake system of claim 5 in which said cable take-up reel has at least two arcuately spaced holes there in and said at least one lever comprises at least two such levers which are separately selectively connected to and removed from different ones of said holes to accommodate stepped rotational movements of said reel and thus achieve greater total rotational movement of said reel than can be achieved by only one of such levers.

7. The parking brake system of claim 3 wherein said cable take-up reel is so adapted for releasable locking engagement with said spring clutch by way of a hub concentric with said cable take-up reel.

8. The parking brake system of claim 1 wherein said lockout spring is a coil torsion spring.

9. The parking brake system of claim 1 wherein said adjuster spring is a coil torsion spring.

10. The parking brake system of claim 1 wherein said first leg is configured so as to prevent movement of said lockout mechanism from its locking position in engagement with said third stop on said cable take-up reel to its released position until said cable take-up reel has rotated in said second rotational direction through a predetermined minimum arcuate distance.

11. The parking brake system of claim 4 wherein said at least one hole and all other parts of said parking brake system are so arranged that said cable take-up reel can be rotated manually by one of said at least one removable lever through a minimum arc first and thereafter by another of said at least one removable lever through an additional minimum arc until the desired lockout position of said cable take-up reel is attained.

12. A parking brake system comprising a cable tensioning mechanism for removing slack from a parking brake cable, said system comprising:
    a bracket;
    an operating lever connected to said bracket for pivotal movement about a first axis between brake-released and brake-applied positions;
    a cable take-up reel connected to said bracket for rotation about a second axis, said second axis being parallel with said first axis, and cable take-up reel being adapted for connection with one end of said cable;
    an adjuster spring rotatably biasing said cable take-up reel with a predetermined biasing force in a first rotational direction about said second axis;
    and at least one removable lever removably connected to said cable take-up reel;
    wherein said cable take-up reel is adapted for selective removable connection with said at least one removable lever and wherein said cable take-up reel is selectively removably connected with said at least one removable lever by any of a plurality of said at least one hole in said cable take-up reel.

13. The parking brake system of claim 12 wherein each of said plurality of said at least one hole is a polygonal hole and each of said at least one lever has a polygonal cross section which mates in driving relation with any of said plurality of said at least one hole.

14. The parking brake system of claim 12, said invention further comprising a lockout mechanism connected to said operating lever for limited rotational movement about a third axis, said third axis being parallel with said first and second axes, said lockout mechanism comprising:
 a rotatably mounted lockout pawl comprising a first leg and a second leg, and
 a lockout spring rotatably biasing said lockout pawl in said first rotational direction about said third axis.

15. A method of assembling a parking brake operating system which has a brake cable subassembly and a parking brake cable tensioning and release subassembly for tensioning and releasing the brake cable subassembly to apply and release the vehicle wheel parking brakes; the brake cable subassembly including a first wheel parking brake cable component and a second wheel parking brake cable component which is selectively attached to the first cable component for operating vehicle parking brakes of a vehicle; and the parking brake cable tensioning and release subassembly including a brake cable operating lever, a cable take-up reel, an adjuster spring for the reel, and a lockout mechanism for selectively locking the reel against rotation;
 said method comprising the steps of:
  mounting the parking brake operating system in a vehicle with the cable subassembly first component unattached to the take-up reel and also unattached to the brake cable subassembly second component, the cable subassembly second component being attached to the vehicle wheel parking brakes for actuation thereof when the cable subassembly second component has brake-applying tension applied thereto;
  rotating the take-up reel against the force of the adjuster spring;
  then actuating the lockout mechanism so as to lock the take-up reel against rotation by the adjuster spring;
  moving the operating lever toward its parking brake applied position while maintaining the take-up reel in its lockout position so as to permit installation of another vehicle component which is best installed with the system installed in the vehicle and the operating lever in its brake-applied position;
  installing such other vehicle component;
  thereafter returning the operating lever to its parking brake released position while still maintaining the take-up reel in its lockout position;
  connecting the brake cable first component to the take-up reel in a position to have its slack taken up by rotation of that reel by force of the adjuster spring when that reel is released from its lock-out position;
  connecting the brake cable subassembly first component to the brake cable subassembly second component;
  and releasing the lockout mechanism only after the brake cable has been also operatively attached in operational parking brake actuatable relationship to the wheel parking brake mechanisms of the vehicle.

16. The method of claim 15 wherein said releasing is accomplished by applying tension force through the cable subassembly first component to the take-up reel with the operating lever remaining in its parking brake released position.

17. The method of claim 15 in which the parking brake cable tensioning and release subassembly further includes a one-way clutch,
 the method further comprising the steps of:
  (a) applying the clutch to prevent relative rotational movement of the take-up reel and the operating lever whenever the operating lever is moved from its parking brake released position toward its parking brake applied position and
  (b) keeping the clutch so applied until the operating lever is returned to its parking brake released position, then releasing the clutch.

\* \* \* \* \*